(12) United States Patent
Wang

(10) Patent No.: US 12,106,152 B2
(45) Date of Patent: Oct. 1, 2024

(54) CLOUD SERVICE SYSTEM AND OPERATION METHOD THEREOF FOR PROVIDING COMPUTING RESOURCES FOR TASK EXECUTION

(71) Applicant: Shanghai Biren Technology Co., Ltd, Shanghai (CN)

(72) Inventor: Xin Wang, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 397 days.

(21) Appl. No.: 17/468,691

(22) Filed: Sep. 8, 2021

(65) Prior Publication Data

US 2023/0032842 A1 Feb. 2, 2023

(30) Foreign Application Priority Data

Jul. 30, 2021 (CN) .......................... 202110871752.5

(51) Int. Cl.
*G06F 9/50* (2006.01)
*G06F 9/38* (2018.01)

(52) U.S. Cl.
CPC .......... *G06F 9/5044* (2013.01); *G06F 9/3877* (2013.01); *G06F 9/5038* (2013.01); *G06F 9/5083* (2013.01); *G06F 9/5094* (2013.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 10,262,390 | B1* | 4/2019 | Sun ........................ | G06F 9/5077 |
| 2011/0131580 | A1* | 6/2011 | Krishnamurthy ..... | G06F 9/5094 |
| | | | | 718/102 |
| 2013/0198760 | A1* | 8/2013 | Cuadra ................. | G06F 9/4881 |
| | | | | 718/106 |
| 2015/0046679 | A1* | 2/2015 | Gathala ................. | G06F 9/4552 |
| | | | | 712/30 |
| 2017/0293994 | A1* | 10/2017 | Li ............................ | G06T 1/20 |
| 2018/0121240 | A1* | 5/2018 | Cai ........................ | G06F 9/4881 |
| 2020/0174838 | A1* | 6/2020 | Li ............................ | G06F 9/505 |
| 2021/0192672 | A1* | 6/2021 | McCrary ............... | G06F 9/4812 |

* cited by examiner

*Primary Examiner* — Adam Lee
(74) *Attorney, Agent, or Firm* — JCIP GLOBAL INC.

(57) ABSTRACT

A cloud service system and an operation method thereof are provided. The cloud service system includes a first computing resource pool, a second computing resource pool, and a task dispatch server. Each computing platform in the first computing resource pool does not have a co-processor. Each computing platform in the second computing resource pool has at least one co-processor. The task dispatch server is configured to receive a plurality of tasks. The task dispatch server checks a task attribute of a task to be dispatched currently among the tacks. The task dispatch server chooses to dispatch the task to be dispatched currently to the first computing resource pool or to the second computing resource pool for execution according to the task attribute.

16 Claims, 3 Drawing Sheets

CLOUD SERVICE SYSTEM AND OPERATION METHOD THEREOF FOR PROVIDING COMPUTING RESOURCES FOR TASK EXECUTION

CROSS-REFERENCE TO RELATED APPLICATION

This application claims the priority benefit of China application serial no. 202110871752.5, filed on Jul. 30, 2021. The entirety of the above-mentioned patent application is hereby incorporated by reference herein and made a part of this specification.

BACKGROUND

Technical Field

The disclosure relates to a cloud server technology, and in particular, to a cloud service system and an operation method thereof.

Description of Related Art

Cloud servers may provide various services, such as computing power services. Cloud servers may further provide computing resources to execute various tasks. Generally, a cloud server refers to a cluster of one or a plurality of computing platforms. The computing platforms may be computers of any type, such as personal computers, servers, workstations, or other types of computers. These computing platforms may be placed in different locations.

SUMMARY

The disclosure provides a cloud service system and an operation method thereof capable of effectively providing computing resources for task execution.

In an embodiment of the disclosure, the disclosure provides a cloud service system including a first computing resource pool, a second computing resource pool, and a task dispatch server. Each computing platform in the first computing resource pool does not have a co-processor. Each computing platform in the second computing resource pool has at least one co-processor. The task dispatch server is configured to receive a plurality of tasks. The task dispatch server establishes a communication connection with each computing platform in the first computing resource pool. The task dispatch server establishes a communication connection with each computing platform in the second computing resource pool. The task dispatch server checks a task attribute of a task to be dispatched currently among the tasks. The task dispatch server chooses to dispatch the task to be dispatched currently to the first computing resource pool or to the second computing resource pool for execution according to the task attribute.

In an embodiment of the disclosure, the disclosure further provides an operation method, and the operation method includes the following steps. A task dispatch server of a cloud service system receives a plurality of tasks. The task dispatch server checks a task attribute of a task to be dispatched currently among the tasks. The task dispatch server chooses to dispatch the task to be dispatched currently to a first computing resource pool of the cloud service system or to a second computing resource pool of the cloud service system for execution according to the task attribute. Herein, each computing platform in the first computing resource pool does not have a co-processor, and each computing platform in the second computing resource pool has at least one co-processor. The task dispatch server establishes a communication connection with each computing platform in the first computing resource pool. The task dispatch server establishes a communication connection with each computing platform in the second computing resource pool.

To sum up, in the embodiments of the disclosure, the task dispatch server may check the task attribute of the task to be dispatched currently. When the task to be dispatched currently needs the computing resources of a co-processor, the task dispatch server may dispatch the task to be dispatched currently to one computing platform in the second computing resource pool for execution. When the task to be dispatched currently does not need the computing resources of a co-processor, the task dispatch server may dispatch the task to be dispatched currently to one computing platform in the first computing resource pool for execution. Therefore, the cloud service system may efficiently and adaptively provide computing resources for task execution.

DESCRIPTION OF THE EMBODIMENTS

Figure 1:
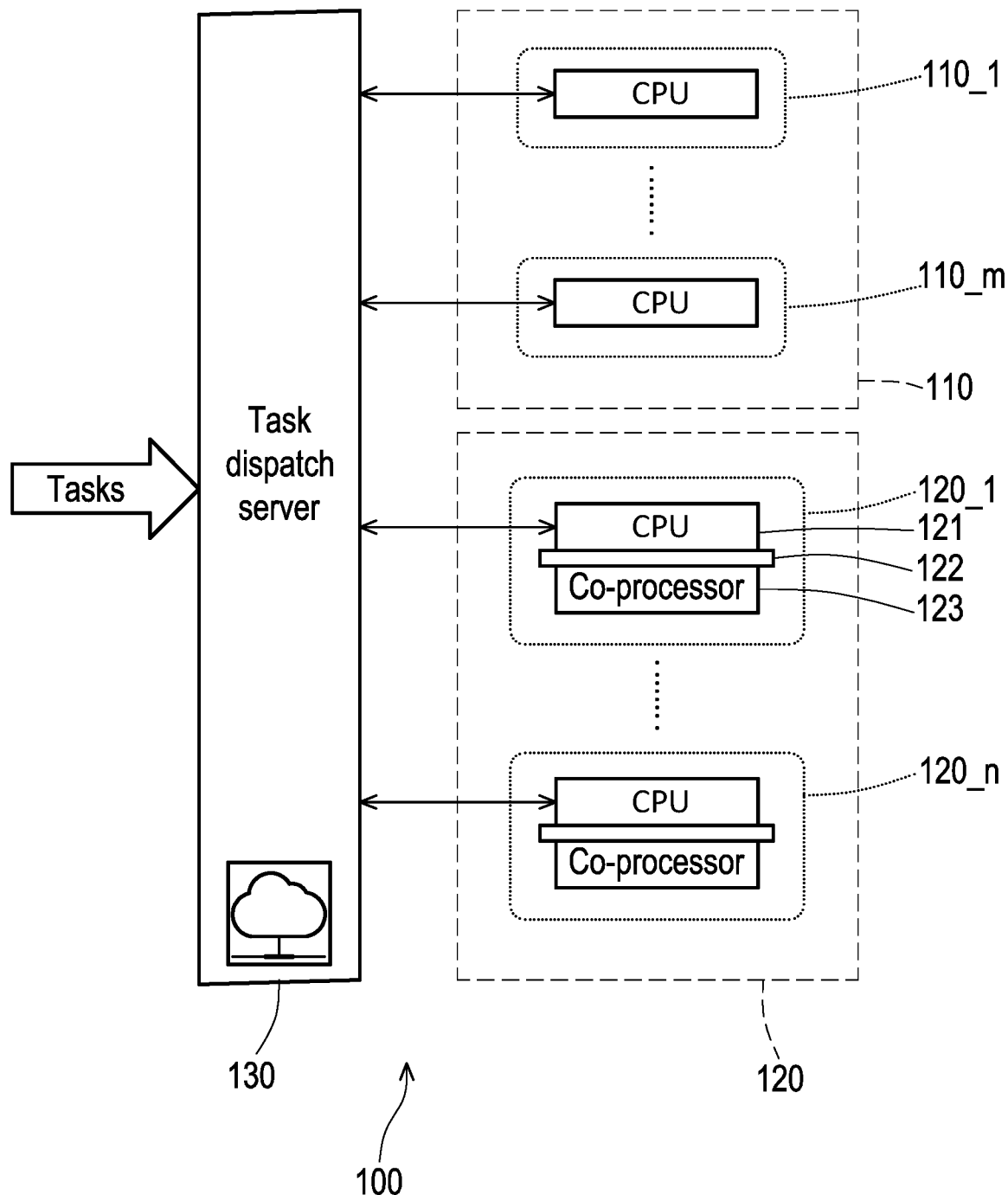
FIG. 1 is a schematic view of a cloud service system according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

FIG. 1 is a schematic view of a cloud service system 100 according to an embodiment of the disclosure. The cloud service system 100 may provide computing resources to execute various types of tasks. The cloud service system 100 includes a first computing resource pool 110, a second computing resource pool 120, and a task dispatch server 130. The first computing resource pool 110 and the second computing resource pool 120 are two parallel resource pools. That is, the task dispatch server 130 establishes a communication connection with each computing platform in the first computing resource pool 110, and the task dispatch server 130 establishes a communication connection with each computing platform in the second computing resource pool 120.

The first computing resource pool 110 includes one or a plurality of computing platforms, such as m computing platforms 110_1, . . . , and 110_m shown in FIG. 1, where m is an integer determined according to actual design/application. Any one of the computing platforms 110_1 to 110_m may be a computer of any type, such as a personal computer, a server, a workstation, or other types of computers. According to actual design/application, these computing platforms 110_1 to 110_m may be placed in different locations (or placed in the same location). Any one of the computing platforms 110_1 to 110_m in the first computing resource pool 110 is configured with a central processing unit (CPU) and other components (not shown) but is not provided with co-processor. In any one of the computing platforms 110_1 to 110_m, a "CPU" module represents one or more CPU chips and/or represents one or more CPU cores. The numbers of the CPU chips and CPU cores in one computing platform may be determined according to actual design/application.

The second computing resource pool 120 includes one or a plurality of computing platforms, such as n computing platforms 120_1, . . . , and 120_n shown in FIG. 1, where n is an integer determined according to actual design/application. Any one of the computing platforms 120_1 to 120_n may be a computer of any type, such as a personal computer, a server, a workstation, or other types of computers. According to actual design/application, these computing platforms 120_1 to 120_n may be placed in different locations (or placed in the same location). Any one of the computing platforms 120_1 to 120_n in the second computing resource pool 120 is configured with a CPU, at least one co-processor, and other components (not shown). For instance, the computing platform 120_1 is configured with a CPU 121 and at least one co-processor 123, and the CPU 121 may dispatch a task to the at least one co-processor 123 for execution through a co-processor programming interface 122. The co-processor programming interface 122 may be an application programming interface (API). In any one of the computing platforms 120_1 to 120_n, a "CPU" module represents one or more CPU chips and/or represents one or more CPU cores. The numbers of the CPU chips and CPU cores in one computing platform may be determined according to actual design/application.

In any one of the computing platforms 120_1 to 120_n, a "co-processor" module represents one or more co-processor chips and/or represents one or more co-processor cores. The numbers of the co-processor chips and co-processor cores in one computing platform may be determined according to actual design/application. According to actual design/application, in some embodiments, the "co-processor" may include a graphics processing unit (GPU), an artificial intelligence (AI) processor, or other co-processors.

Figure 2:
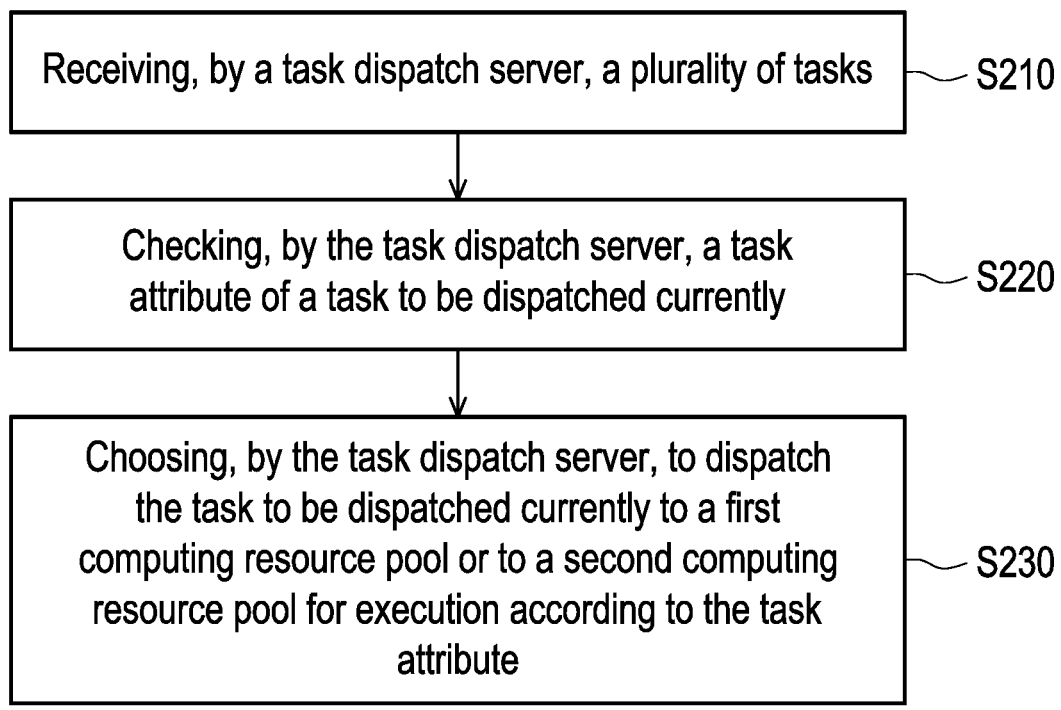
FIG. 2 is a schematic flow chart of an operation method of the cloud service system according to an embodiment of the disclosure.

FIG. 2 is a schematic flow chart of an operation method of the cloud service system according to an embodiment of the disclosure. With reference to FIG. 1 and FIG. 2, in step S210, the task dispatch server 130 may receive a plurality of tasks. In step S220, the task dispatch server 130 may check a task attribute of any task, such as a task to be dispatched currently, among the plurality of tasks. In step S230, the task dispatch server 130 may select the first computing resource pool 110 or the second computing resource pool 120 according to the task attribute and then dispatches the task to be dispatched currently to the selected resource pool for execution or activation.

The first computing resource pool 110 (may be referred to as a CPU pool) and the second computing resource pool 120 (may be referred to as a co-processor pool) are independent of each other. The CPU in any one of the computing platforms 120_1 to 120_n (a co-processor physical system) may be fully utilized. The task dispatch server 130 may select the co-processor pool 120 parallel to the CPU pool 110 to independently activate/execute a task. The task dispatch server 130 may select the first computing resource pool 110 or the second computing resource pool 120 based on the task attribute (for example, using only a CPU or using a co-processor). After the computing resource pool is selected, the task dispatch server 130 may implement any task dispatch technique (for example, an existing task dispatch algorithm or other task dispatch algorithms) to perform task dispatch.

The task dispatch server 130 may further apply any dispatch optimization technique (for example, an existing task dispatch optimization algorithm or other task dispatch optimization algorithms) according to the requirements of the task to be dispatched currently for the co-processors. For instance, the task dispatch server 130 may select one computing platform from the second computing resource pool 120 to act as a dispatch destination of the task to be dispatched currently according to the number of co-processors of each of the computing platforms 120_1 to 120_n in the second computing resource pool 120, current computing power of each co-processor, and a co-processor computing power requirement of the task to be dispatched currently. All existing virtual machine (VM) or container techniques may be applied to the task dispatch server 130 without modification.

Similarly, the task dispatch server 130 may further apply any dispatch optimization technique according to the requirements of the task to be dispatched currently for the CPUs. For instance, the task dispatch server 130 may select one computing platform from the first computing resource pool 110 to act as the dispatch destination of the task to be dispatched currently according to current computing power of each CPU of each of the computing platforms 110_1 to 110_n and a CPU computing power requirement of the task to be dispatched currently.

In addition, as an implementation option, in step S230, after selecting the first computing resource pool 110 or the second computing resource pool 120 according to the task attribute and dispatching the task to be dispatched currently to the selected computing resource pool, the task dispatch server 130 may further select one computing platform from the first computing resource pool 110 or the second computing resource pool 120 to act as the dispatch destination of the task to be dispatched currently according to the current computing power of the CPU or the co-processor in each computing platform of the first computing resource pool 110 or the second computing resource pool 120 and the CPU computing power requirement or the co-processor computing power requirement of task to be dispatched currently. That is, the task to be dispatched currently may be re-assigned (not shown) by the first computing resource pool 110 or by the second computing resource pool 120.

In the embodiments shown in FIG. 1, the task dispatch server 130 may unify the access of the co-processor pool (the second computing resource pool 120). Without the need to intercept and implement remote API calls, the task dispatch server 130 may use a co-processor (e.g., the at least one co-processor 123) under the control of a conventional local CPU (e.g., the CPU 121). Therefore, the cloud service system 100 may automatically maintain the native efficiencies of the computing platforms and unrestrictedly provide a unified solution for any type of co-processors.

Figure 3:
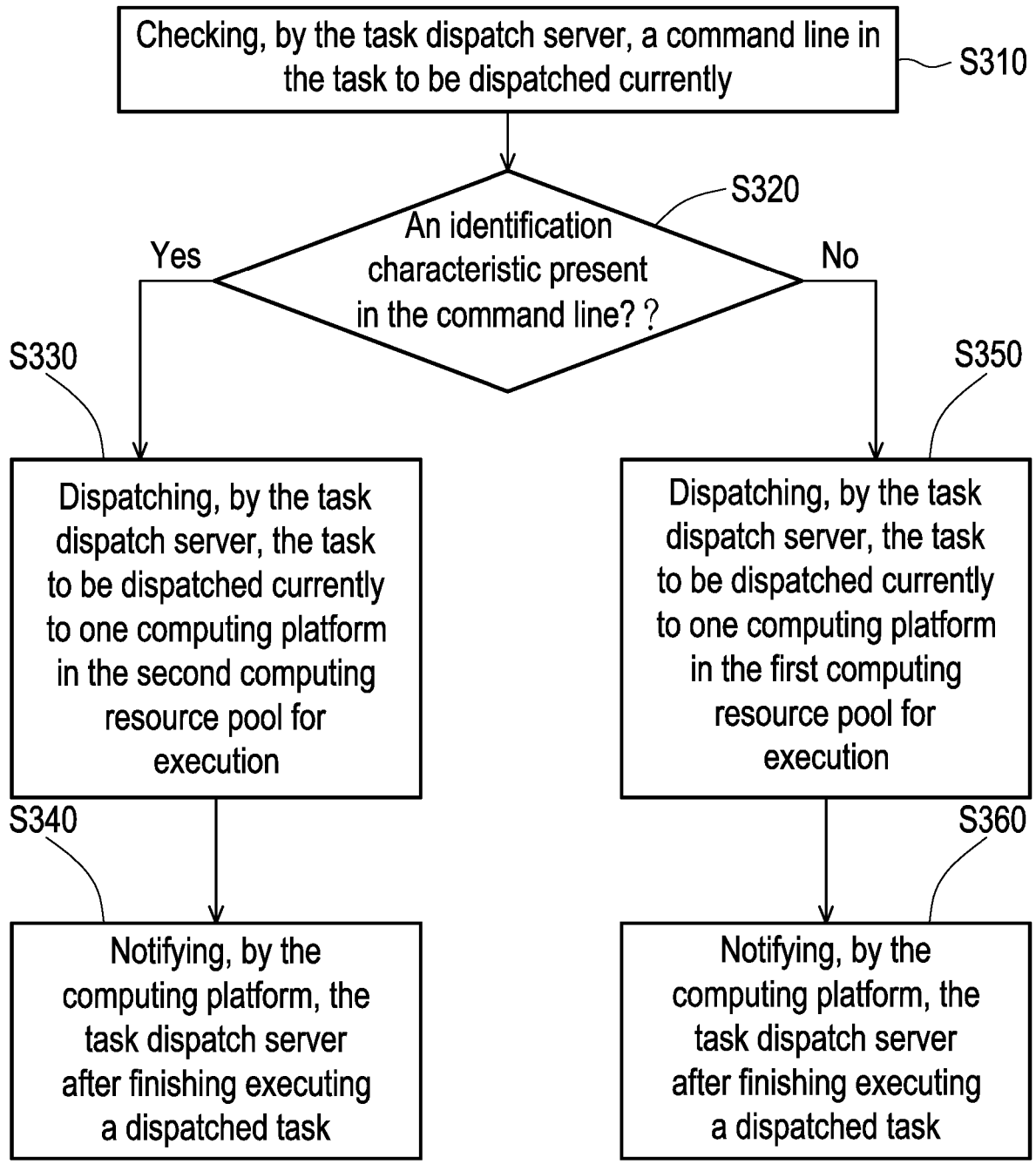
FIG. 3 is a schematic flow chart illustrating task checking performed by a task dispatch server according to an embodiment of the disclosure.

In this embodiment, the specific manner in which the task dispatch server 130 performs task checking is not limited. A user may design a specific interface according to the task dispatch server 130 to display and mark the characteristics of the required co-processor. According to actual design, in some embodiments, the task dispatch server 130 may determine the task attribute of the task to be dispatched currently according to an identification characteristic of a command line in the task to be dispatched currently. For instance, FIG. 3 is a schematic flow chart illustrating task checking performed by the task dispatch server 130 according to an embodiment of the disclosure. With reference to FIG. 1 and FIG. 3, in step S210, the task dispatch server 130 may check a command line in the task to be dispatched currently. When the identification characteristic corresponding to the co-processors is present in the command line of the task to be dispatched currently ("yes" is determined in a determination result of step S320), the task dispatch server 130 may perform step S330. When the identification characteristic corresponding to the co-processors is not present in all command lines of the task to be dispatched currently ("no" is determined in the determination result of step S320), the task dispatch server 130 may perform step S350.

The "identification characteristic" described in step S310 and step S320 may be defined according to actual design/application. For instance, in some embodiments, if the word "-GPU" appears in a command line, it means that such a command line needs to use the GPU computing power. Therefore, in such an implementation scenario, the "-GPU" may be used as the "identification characteristic".

In step S330, the task dispatch server 130 may dispatch the task to be dispatched currently to one computing platform among the computing platforms 120_1 to 120_n in the second computing resource pool 120 (the co-processor pool) for execution. For the convenience of description, it is assumed herein that the task dispatch server 130 dispatches the task to be dispatched currently to the computing platform 120_1 in the second computing resource pool 120 in step S330. The CPU 121 of the computing platform 120_1 may accept a dispatched task sent from the task dispatch server 130. The CPU 121 may manage and dispatch a plurality of jobs of the dispatched task. The CPU 121 may dispatch at least one job among the jobs to the at least one co-processor 123 for execution through the co-processor programming interface 122. After the computing platform 120_1 finishes executing the dispatched task, the CPU 121 may notify the task dispatch server 130 (step S340), and the user may obtain and further use an execution result through the task dispatch server 130 in a conventional manner.

In this embodiment, the specific implementation manner of "the CPU 121 dispatching a job to the at least one co-processor 123" is not limited. According to actual design, in some embodiments, the CPU 121 may check a job attribute of a job to be dispatched currently among the jobs, and the CPU 121 may choose to dispatch the job to be dispatched currently to the at least one co-processor 123 or the CPU 121 for execution according to the job attribute. The CPU 121 may further apply any dispatch optimization technique (for example, an existing task dispatch optimization algorithm or other task dispatch optimization algorithms) according to the requirements of the job to be dispatched currently for the at least one co-processor 123. For instance, the CPU 121 may select one co-processor among the at least one co-processor 123 to act as the dispatch destination of the job to be dispatched currently according to the number of co-processors of the at least one co-processor 123, current computing power of each co-processor among the at least one co-processor 123, and a co-processor computing power requirement of the job to be dispatched currently. The number of co-processors may be the number of one or more computing accelerator cards (e.g., graphics cards or AI accelerator cards) installed on the computing platform 120_1, the number of computing acceleration integrated circuits (e.g., GPU chips or AI chips) in the computing platform 120_1, and/or the number of computing acceleration cores (e.g., GPU cores or AI cores) installed in one or more integrated circuits of the computing platform 120_1.

In step S350, the task dispatch server 130 may dispatch the task to be dispatched currently to one computing platform among the computing platforms 110_1 to 110_m in the first computing resource pool 110 (the CPU pool) for execution. For the convenience of description, it is assumed herein that the task dispatch server 130 dispatches the task to be dispatched currently to the computing platform 110_1 in the first computing resource pool 110 in step S350. The CPU of the computing platform 110_1 accepts a dispatched task sent from the task dispatch server 130. The CPU of the computing platform 110_1 execute the dispatched task. After the CPU of the computing platform 110_1 finishes executing the dispatched task, the CPU of the computing platform 110_1 may notify the task dispatch server 130 (step S360), and the user may obtain and further use the execution result through the task dispatch server 130 in a conventional manner.

In view of the foregoing, the task dispatch server 130 may check the task attribute of the task to be dispatched currently. When the task to be dispatched currently needs the computing resources of a co-processor (e.g., GPU or AI processor), the task dispatch server 130 may dispatch the task to be dispatched currently to one computing platform among the computing platforms 120_1 to 120_n in the second computing resource pool 120 (the co-processor pool) for execution. When the task to be dispatched currently does not need the computing resources of a co-processor, the task dispatch server 130 may dispatch the task to be dispatched currently to one computing platform among the computing platforms 110_1 to 110_m in the first computing resource pool 110 (the CPU pool) for execution. Therefore, the cloud service system 100 may efficiently and adaptively provide computing resources for task execution.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A cloud service system, comprising:
   a first computing resource pool comprising a plurality of computing platforms operating at a first efficiency, wherein each computing platform in the first computing resource pool does not have a co-processor;
   a second computing resource pool comprising a plurality of computing platforms operating at a second efficiency, wherein each computing platform in the second computing resource pool has at least one co-processor, one computing platform in the second computing resource pool comprises a central processing unit, the central processing unit controls the at least one co-processor of each computing platform in the second computing resource pool, and the at least one co-processor of each computing platform in the second computing resource pool is a different type of co-processor; and
   a task dispatch server, configured to
      receive a plurality of tasks,
      establish a communication connection with each computing platform in the first computing resource pool, establish a communication connection with each computing platform in the second computing resource pool, dispatch a first task among the plurality of tasks to the first computing resource pool or the second computing resource pool for execution according to a task attribute of the first task, dispatch a second task among the plurality of tasks to the central processing unit of the one computing platform in the second computing resource pool without intercepting and without implementing remote application programming interface (API) calls of a co-processor API while maintaining the first efficiency and the second efficiency, wherein when the central processing unit receives the second task from the task dispatch server, the central processing unit dispatches the second task to one co-processor through the co-processor API that interfaces between the central processing unit and the at least one co-processor of each computing platform in the second computing resource pool, and the one co-processor executes the second task, and when the one co-processor finishes executing the second task, the central processing unit notifies the task dispatch server.

2. The cloud service system according to claim 1, wherein the at least one co-processor comprises a graphics processing unit or an artificial intelligence processor.

3. The cloud service system according to claim 1, wherein the first computing resource pool and the second computing resource pool are two parallel resource pools.

4. The cloud service system according to claim 1, wherein one computing platform from the second computing resource pool acts as a dispatch destination of the first task according to at least one of the number of co-processors of each computing platform in the second computing resource pool, current computing power of each co-processor, and a co-processor computing power requirement of the first task.

5. The cloud service system according to claim 1, wherein the task attribute of the first task is based on an identification characteristic of a command line in the first task.

6. The cloud service system according to claim 5, wherein the task dispatch server dispatches the first task to one computing platform in the second computing resource pool for execution when the identification characteristic is present in the command line of the first task, and the task dispatch server dispatches the first task to one computing platform in the first computing resource pool for execution when the identification characteristic is not present in all command lines of the first task.

7. The cloud service system according to claim 1, wherein the central processing unit dispatches a job to a co-processor of the at least one co-processor or the central processing unit for execution according to a job attribute, wherein the first task comprises the job and at least one other job.

8. The cloud service system according to claim 7, wherein one co-processor among the at least one co-processor acts as a dispatch destination of the job according to the number of co-processors of the at least one co-processor, current computing power of each co-processor among the at least one co-processor, and a co-processor computing power requirement of the job.

9. An operation method of a cloud service system, comprising:

receiving, by a task dispatch server of the cloud service system, a plurality of tasks, the cloud service system comprising:

a first computing resource pool comprising a plurality of computing platforms operating at a first efficiency, wherein each computing platform in the first computing resource pool does not have a co-processor; and a second computing resource pool comprising a plurality of computing platforms operating at a second efficiency, wherein each computing platform in the second computing resource pool has at least one co-processor, one computing platform in the second computing resource pool comprises a central processing unit, the central processing unit controls the at least one co-processor of each computing platform in the second computing resource pool, and the at least one co-processor of each computing platform in the second computing resource pool is a different type of co-processor;

establishing, by the task dispatch server, a communication connection with each computing platform in the first computing resource pool;

establishing, by the task dispatch server, a communication connection with each computing platform in the second computing resource pool;

dispatching, by the task dispatch server, a first task among the plurality of tasks to the first computing resource pool of the cloud service system or to the second computing resource pool of the cloud service system for execution according to an attribute of the first task;

dispatching, by the task dispatch server, second task among the plurality of tasks to the central processing unit of the one computing platform in the second computing resource pool without intercepting and without implementing remote application programming interface (API) calls of a co-processor API while maintaining the first efficiency and the second efficiency;

receiving, by the central processing unit, the second task from the task dispatch server;

dispatching, by the central processing unit, the second task to one co-processor for execution through the co-processor API that interfaces between the central processing unit and the at least one co-processor of each computing platform in the second computing resource pool;

executing, by the one co-processor, the second task; and notifying, by the central processing unit, the task dispatch server when the one co-processor finishes executing the second task.

10. The operation method according to claim 9, wherein the at least one co-processor comprises a graphics processing unit or an artificial intelligence processor.

11. The operation method according to claim 9, wherein the first computing resource pool and the second computing resource pool are two parallel resource pools.

12. The operation method according to claim 9, wherein one computing platform from the second computing resource pool acts as a dispatch destination of the first task according to at least one of the number of co-processors of each computing platform in the second computing resource pool, current computing power of each co-processor, and a co-processor computing power requirement of the first task.

13. The operation method according to claim 9, wherein the task attribute of the first task is based on an identification characteristic of a command line in the first task.

14. The operation method according to claim 13, further comprising:

dispatching, by the task dispatch server, the first task to one computing platform in the second computing resource pool for execution when the identification characteristic is present in the command line of the first task; and dispatching, by the task dispatch server, the first task to one computing platform in the first computing resource pool for execution when the identification characteristic is not present in all command lines of the first task.

15. The operation method according to claim 9, further comprising:

dispatching, by the central processing unit, a job to a co-processor of the at least one co-processor or the central processing unit for execution according to a job attribute, wherein the first task comprises the job and at least one other job.

16. The operation method according to claim 15, wherein one co-processor among the at least one co-processor acts as a dispatch destination of the job according to the number of co-processors of the at least one co-processor, current computing power of each co-processor among the at least one co-processor, and a co-processor computing power requirement of the job.

\* \* \* \* \*